(12) United States Patent
Afify et al.

(10) Patent No.: US 7,860,705 B2
(45) Date of Patent: Dec. 28, 2010

(54) METHODS AND APPARATUS FOR CONTEXT ADAPTATION OF SPEECH-TO-SPEECH TRANSLATION SYSTEMS

(75) Inventors: Mohamed A. Afify, Portchester, NY (US); Yuqing Gao, Mount Kisco, NY (US); Liang Gu, Yorktown, NY (US); Hong-Kwang Jeff Kuo, Pleasantville, NY (US); Bowen Zhou, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 11/514,604

(22) Filed: Sep. 1, 2006

(65) Prior Publication Data

US 2008/0059147 A1 Mar. 6, 2008

(51) Int. Cl.
*G06F 17/28* (2006.01)
*G10L 15/00* (2006.01)
*G10L 13/00* (2006.01)

(52) U.S. Cl. ............... 704/3; 704/2; 704/231; 704/258

(58) Field of Classification Search .......... 704/2–8, 704/277
See application file for complete search history.

(56) References Cited

U.S. PATENT DOCUMENTS

| | | | |
|---|---|---|---|
| 5,510,981 A | 4/1996 | Berger et al. | |
| 5,546,500 A * | 8/1996 | Lyberg | 704/277 |
| 5,933,805 A * | 8/1999 | Boss et al. | 704/249 |
| 6,292,769 B1 | 9/2001 | Flanagan et al. | |
| 6,859,778 B1 * | 2/2005 | Bakis et al. | 704/277 |
| 6,952,665 B1 * | 10/2005 | Shimomura et al. | 704/2 |
| 7,496,498 B2 * | 2/2009 | Chu et al. | 704/4 |
| 2003/0149558 A1 * | 8/2003 | Holsapfel et al. | 704/4 |
| 2003/0182123 A1 * | 9/2003 | Mitsuyoshi | 704/270 |
| 2004/0111272 A1 * | 6/2004 | Gao et al. | 704/277 |
| 2004/0172257 A1 * | 9/2004 | Liqin et al. | 704/277 |
| 2004/0243392 A1 * | 12/2004 | Chino et al. | 704/7 |
| 2005/0038662 A1 | 2/2005 | Sarich et al. | |
| 2005/0159958 A1 * | 7/2005 | Yoshimura | 704/276 |
| 2005/0261910 A1 * | 11/2005 | Precoda et al. | 704/277 |
| 2007/0011012 A1 * | 1/2007 | Yurick et al. | 704/277 |

* cited by examiner

*Primary Examiner*—Richemond Dorvil
*Assistant Examiner*—Douglas C Godbold
(74) *Attorney, Agent, or Firm*—Anne V. Dougherty; Ryan, Mason & Lewis, LLP

(57) ABSTRACT

A technique for context adaptation of a speech-to-speech translation system is provided. A plurality of sets of paralinguistic attribute values is obtained from a plurality of input signals. Each set of the plurality of sets of paralinguistic attribute values is extracted from a corresponding input signal of the plurality of input signals via a corresponding classifier of a plurality of classifiers. A final set of paralinguistic attribute values is generated for the plurality of input signals from the plurality of sets of paralinguistic attribute values. Performance of at least one of a speech recognition module, a translation module and a text-to-speech module of the speech-to-speech translation system is modified in accordance with the final set of paralinguistic attribute values for the plurality of input signals.

20 Claims, 2 Drawing Sheets

METHODS AND APPARATUS FOR CONTEXT ADAPTATION OF SPEECH-TO-SPEECH TRANSLATION SYSTEMS

STATEMENT OF GOVERNMENT RIGHTS

This invention was made with Government support under Contract No.: NBCH3039004 awarded by Defense of Advanced Research Projects Agency (DARPA). The Government has certain rights in this invention.

FIELD OF THE INVENTION

The present invention relates to speech-to-speech translation systems and, more particularly, to detection and utilization of paralinguistic information in speech-to-speech translation systems.

BACKGROUND OF THE INVENTION

A speech signal carries a wealth of paralinguistic information in addition to the linguistic message. Such information may include, for example, the gender and age of the speaker, the dialect or accent, emotions related to the spoken utterance or conversation, and intonation, which may indicate intent, such as question, command, statement, or confirmation seeking. Moreover, the linguistic message itself carries information beyond the meaning of the words it contains. For example, a sequence of words may reflect the educational background of the speaker. In some situations, the words can reveal whether a speaker is cooperative on a certain subject. In human-to-human communication this information is used to augment the linguistic message and guide the course of conversation to reach a certain goal. This may not be possible depending only on the words. In addition to the speech signal, human-to-human communication is often guided by visual information, such as, for example, facial expressions and other simple visual cues.

Modern speech-to-speech translation systems aim at breaking the language barriers between people. Ultimately, these systems should facilitate the conversation between two persons who do not speak a common language in the same manner as between people who speak the same or a common language.

In some languages, statements and questions differ only in terms of the intonation, and not the choice of words. When translating such sentences into these languages, it is important to notify the user as to whether these sentences are questions or statements. Current systems are not able to provide this function, and users can only make a best guess, which can lead to gross miscommunication.

In many cultures, spoken expressions are heavily influenced by the identities of the speaker and listener and the relationship between them. For example, gender plays a large role in the choice of words in many languages, and ignoring gender differences in speech-to-speech translation can result in awkward consequences. Furthermore, in many cultures, speaking to a teacher, an elder, or a close friend can greatly influence the manner of speech, and thus whether the translation is in a respectful or familiar form.

However, state-of-the-art implementations of speech-to-speech translation systems do not use paralinguistic information in the speech signal. This serious limitation may cause misunderstanding in many situations. In addition, it can affect the performance of the system by trying to model a large space of possible translations irrespective of the appropriate context. The use of paralinguistic information can be used to provide an appropriate context for the conversation, and hence, to improve system performance through focusing on the relevant parts of a potentially huge search space.

SUMMARY OF THE INVENTION

The present invention provides techniques for detection and utilization of paralinguistic information in speech-to-speech translation systems.

For example, in one aspect of the invention, a technique for context adaptation of a speech-to-speech translation system is provided. A plurality of sets of paralinguistic attribute values is obtained from a plurality of input signals. Each set of the plurality of sets of paralinguistic attribute values is extracted from a corresponding input signal of the plurality of input signals via a corresponding classifier of a plurality of classifiers. A final set of paralinguistic attribute values is generated for the plurality of input signals from the plurality of sets of paralinguistic attribute values. Performance of at least one of a speech recognition module, a translation module and a text-to-speech module of the speech-to-speech translation system is modified in accordance with the final set of paralinguistic attribute values for the plurality of input signals.

In accordance with another aspect of the invention, a context adaptable speech-to-speech translation system is provided. The system comprises a plurality of classifiers, a fusion module and speech-to-speech translation modules. Each of the plurality of classifiers receives a corresponding input signal and generates a corresponding set of paralinguistic attribute values. The fusion module receives a plurality of sets of paralinguistic attribute values from the plurality of classifiers and generates a final set of paralinguistic attribute values. The speech-to-speech translation modules comprise a speech recognition module, a translation module, and a text-to-speech module. Performance of at least one of the speech recognition module, the translation module and the text-to-speech module is modified in accordance with the final set of paralinguistic attribute values for the plurality of input signals.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for detection and utilization of paralinguistic information in speech-to-speech translation systems.

Context based speech-to-speech translation is dependent on paralinguistic information provided by the users. The system adapts based on cues automatically detected by the system or entered by the user. Speech-to-speech translation may be operated on both hand-held devices and more powerful computers or workstations. In both cases, these devices usually have the capability of handling multi-sensory input, such as, for example, images, text and pointing devices, in addition to the speech signal. In the embodiments of the present invention, the use of paralinguistic information in speech-to-speech translation systems is described. The paralinguistic information is extracted from multi-modal input, and the different inputs are then fused to generate a decision that is used to provide an appropriate context for speech-to-speech translation system. This decision is also used to adapt the corresponding system parameters towards obtaining more focused models and hence potentially improving system performance.

For illustration, assume that it is desired to determine the gender of the speaker. This can be achieved through gender detection based on statistical models from the speech signal and also through image recognition. In this case, it is easy for the operator to also select the gender through a pointing device. Decisions from different modalities are input to a fusion center. This fusion center determines a final decision using local decisions from multiple streams. In the gender detection case the operator input might be given a higher confidence in obtaining the final decision, since it is relatively simple for a human operator to determine the gender of a person. On the other hand, if the purpose is to determine the accent of the speaker, it may be difficult for the human operator to come up with the required decision. Therefore, in this situation the fusion center might favor the output of a statistical accent recognizer that uses the speech signal as input.

Figure 1:
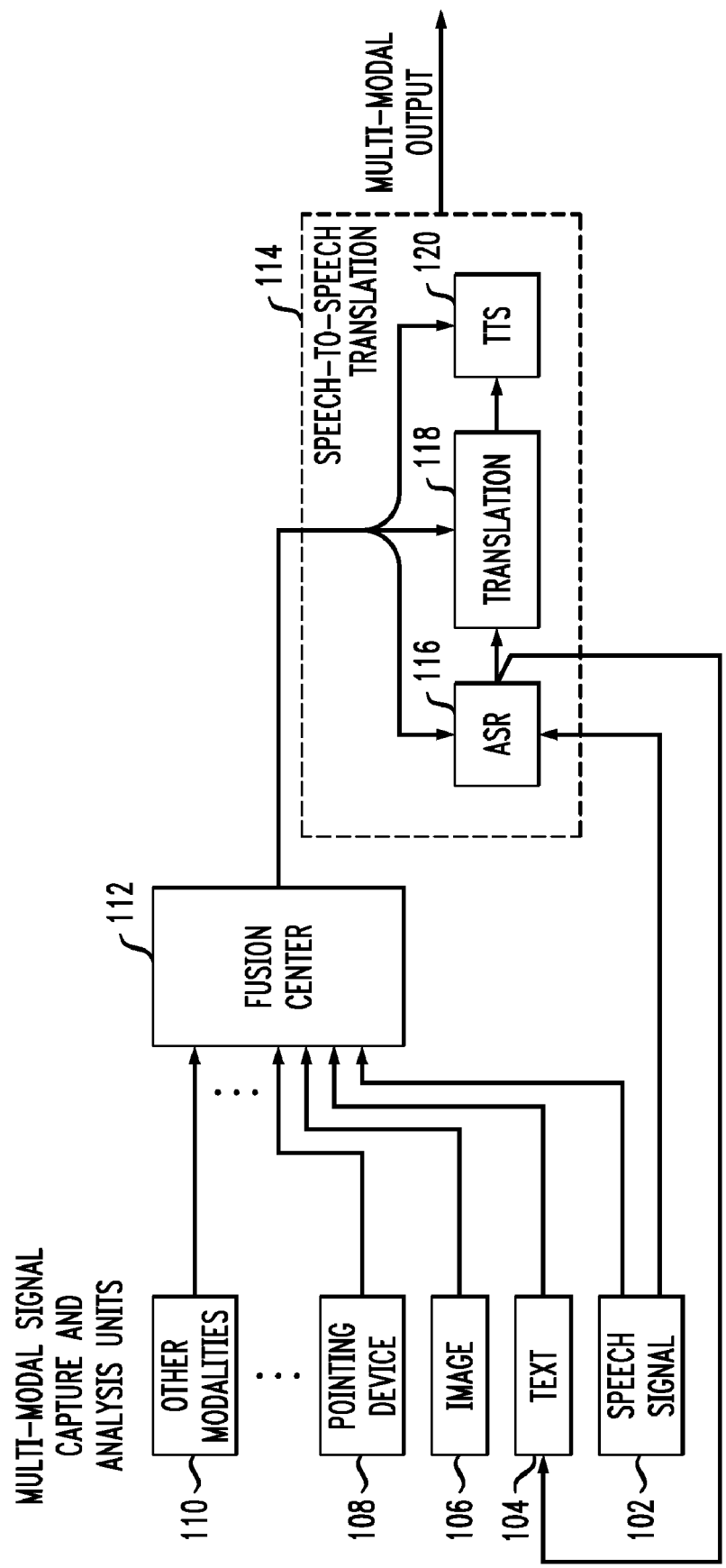
FIG. 1 is a block diagram illustrating a context adaptable speech-to-speech translation system, according to an embodiment of the present invention.

Referring initially to FIG. 1, a block diagram illustrates a context adaptable speech-to-speech translation system, according to an embodiment of the present invention. Different modalities are first used to extract paralinguistic information from input signals. Four classifiers for such modalities are specifically shown in the embodiment of the present invention shown in FIG. 1: a speech signal classifier 102, a text input classifier 104, a visual signal classifier 106, and a pointing device classifier 108. Pointing device classifier 108 can be used by the system operator, and text input classifier 104 enables text to be entered by the operator or obtained as a feedback from automatic speech recognition, as will be described in further detail below. Additional potentially useful classifiers 110 may be added. The paralinguistic information obtained by these classifiers includes, for example, gender, accent, age, intonation, emotion, social background and educational level, in addition to any other related information that could be potentially extracted from the inputs.

Each classifier will accept a corresponding signal as input, perform some feature extraction from the signal that facilitates the decision making process, and will use some statistical models that are trained in a separate training session to perform the desired attribute classification. The operation of these classifiers can be formulated in the following equation:

$$\overline{A} = \arg\max_{A} p_\theta(X \mid A) p(A)$$

where A is the desired attribute, X is the input signal or a set of features extracted from the input signal, $p_\theta( )$ is a parametric model having parameter set $\theta$, and p(A) is a prior probability of the attribute A. Both probabilities are trained using some labeled training data. The argmax operation represents a search over the possible values of a given attribute.

The use of the speech signal in speech signal classifier 102, for determining the gender, age, accent, emotion and intonation can be based on the statistical classifier outlined above. The speech signal is first processed to extract the spectral component, pitch information, or possibly any other feature that can be useful to classify the desired attribute. Statistical models like Gaussian mixture models or hidden Markov models, and also classifiers like neural networks or support vector machines can be trained on the appropriate set of features to perform the required classification. In addition to providing a hard classification decision, most of these classifiers can also output a soft classification which is based on posterior probabilities or any other appropriate normalization. This soft score can be input to the fusion center to help in designing a better combination process.

Text can be used to automatically extract a lot of important information such as the topic or certain desired entities that are not readily clear from the word sequence itself at text classifier 104. Features can vary from simple words and N-grams to more sophisticated parser or part-of-speech based features. Also classifiers include statistical models as maximum entropy classifiers or linear or non-linear networks. In the context of speech-to-speech translation text based attributes may include the social or educational background of the user or his desire to cooperate on a certain matter. Text classifier 104 may take the output of an automatic speech recognition (ASR) module instead of requiring the operator to enter the text. The latter might be time consuming and even impractical in certain situations.

Like the speech signal the visual image of the speaker may also reveal many attributes through visual signal classifier 106. Such attributes include, among others, face, and accordingly gender, and emotion detection. Also, as an example, dynamic attributes such as how frequently the eyes blink could also be used to judge whether the respondent is telling the truth. Like the classifiers of the speech signal the required classifiers need a feature extraction step followed by a statistical model or a classification network trained on the corresponding feature using a labeled corpus. In the image case feature extraction generally consists of either direct pixel regions or more sophisticated analysis and/or contour based techniques.

Pointing device classifier 108 allows a user to input the corresponding attribute using a pointing device. The embodiments of the present invention are flexible and it is possible to add any modality or other information streams once it is judged important for distinguishing an attribute of interest. The only requirement is to be able to build a classifier based on the signal.

It is important to note that not every modality will be suitable for every attribute. For example both the speech and visual inputs might be useful in determining the gender of the user, while visual signal is clearly not very helpful in deciding the user's accent.

Referring back to FIG. 1, a fusion module 112 receives the output of the modality classifiers about each paralinguistic attribute and possibly some confidence measure related to the classifier score. It also uses the knowledge about the "usefulness" of each modality for determining each paralinguistic attribute.

The output of each classifier $m_i$ is a vector $v_i = (a_1, s_1, a_2, s_2, \ldots, a_N, s_N)$, where $a_j$ stands for the value of an attribute of interest, e.g., female for gender, and the corresponding $s_j$ is a confidence score that is optionally supplied by the classifier, and N is the total number of attributes of interest. For example, (male, southern-accent, middle-aged, question, . . . ) may be a vector for the attributes (gender, accent, age, intonation, . . . ).

As a modality might not contribute to all the attributes some of the values may be considered as a "don't care" or undefined. The role of fusion module 112 is to combine all the vectors $v_i$ to come up with a unique decision for each of the N attributes. Alternatively, some simple ad-hoc techniques can also be used. The final output will be a vector $v=(a_1, a_2, \ldots, a_N)$, with a value for each of the desired attributes that is passed to the speech-to-speech translation system.

Referring again back to FIG. 1, the vector of paralinguistic attributes is passed to a speech-to-speech translation system 114 and can be used to control the performance of its different modules. Speech-to-speech translation system 114 has three major components: a speech recognition module 116, a translation module 118, and a text-to-speech module 120. Paralinguistic information can be used to potentially improve the performance of each component to provide social context and possibly modify the model parameters to potentially improve performance. Each component does not necessarily utilize all the attributes supplied.

The use of paralinguistic information such as gender, age, accent, and emotion in improving the acoustic model of ASR systems is well known. The main idea is to construct different models conditioned on different paralinguistic attributes and dynamically selecting the appropriate model during operation. In principle this leads to sharper models, and hence better performance.

The language model (LM) in ASR module 116 typically uses N-grams, i.e., the probability of a word conditioned on the previous N−1 words. Each attribute vector can be considered as a "state" in a large state space. It is possible using data annotated with paralinguistic information to build N-grams conditioned on these states, or on an appropriate clustering of the states. This will lead to sharper model, but because there will typically be a very large number of these states, a data sparseness problem will arise. A possible solution is to form the final N-gram LM as a mixture of individual state N-grams as follows:

$$p(w|h) = \sum_s p(w|h, s)p(s)$$

where h is the N-gram history, s is the state, and the summation is over the state space of the attribute vector.

For each input speech utterance, a probability model is used to detect whether it is a question or not by using a variety of features such as intonation, word order, word context and conversation context. This decision of question or statement is then indicated to the users through various means, such as punctuations displayed on the screen, intonation of the spoken translation, specific audio or spoken prompt. In particular, if a question is detected, then a question mark is added to the translated sentence and displayed on the screen. In addition, a spoken sound of "Question:" is added at the beginning of the translated sentence. For example, if the input is "Are you okay?" in English, the translation may be something like "Question: You are okay?" in the translated language.

Translation module 118 uses language models and translation models. Language models (either for words or phrases) can use paralinguistic information in the same way as in ASR. Moreover, translation models basically calculate the co-occurrence probabilities of words and phrases in a parallel corpus of the source and target languages. So roughly speaking their estimation is simply a counting process, the same as N-grams, but using the parallel corpus. Thus, the idea of conditioning on various paralinguistic entities with appropriate smoothing is also applicable here.

TTS modules 120 need paralinguistic information to be able to generate more expressive and natural speech. This can be used to access a multi-expression database based on an input attribute vector to generate the appropriate expression and intonation for the context of the conversation. In the absence of multi-expression recordings it is also possible to use paralinguistic information to generate appropriate targets for the intonation or expression of interest and accordingly modify an existing instance to create the required effect. In addition to help in generating appropriate intonation and expression the use of paralinguistic information can also aid in obtaining better pronunciation. For example, in translation from English to Arabic, the sentence "How are you?" would translate into "kayfa HaAlak" or "kayfa HaAlik" depending on whether speaking to a male or a female, respectively. As most translation systems from E2A do not use short vowel information the Arabic translation passed to the TTS would be "kyf HAlk." Based on the appropriate paralinguistic information the TTS can generate the correct pronunciation.

Assume that it is known that the gender of the speaker is male, providing social context will let the system address the user by saying "good morning sir" instead of using a generic "good morning." This might create better confidence in the system response on the user part. On the other hand adapting the model parameters, still keeping the male example, would change the language model probabilities, say, so that the probability of the sentence "my name is Roberto" will be higher than the sentence "my name is Roberta."

Figure 2:
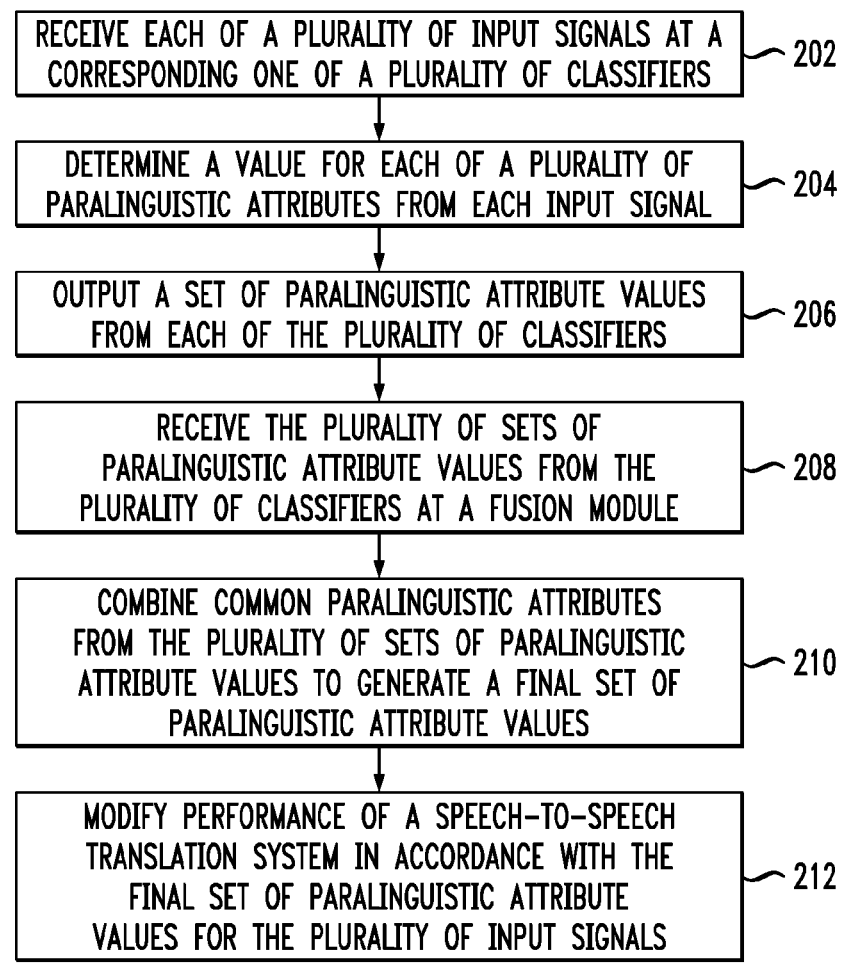
FIG. 2 is a flow diagram illustrating a context adaptation methodology for a speech-to-speech translation system, according to an embodiment of the present invention.

Referring now to FIG. 2, a flow diagram illustrates a context adaptation methodology for a speech-to-speech translation system, according to an embodiment of the present invention. The methodology begins in block 202 where each of a plurality of input signals is received at a corresponding one of the plurality of classifiers. In block 204, a value for each of a plurality of paralinguistic attributes are determined from each input signal. In block 206, a set of paralinguistic attribute values are output from each of the plurality of classifiers.

In block 208, the plurality of sets of paralinguistic attribute values are received from the plurality of classifiers at a fusion module. In block 210, values of common paralinguistic attributes from the plurality of sets of paralinguistic attribute values are combined to generate a final set of paralinguistic attribute values. In block 212, model parameters of a speech-to-speech translation system are modified in accordance with the final set of paralinguistic attribute values for the plurality of input signals.

Most of the applications of paralinguistic information to various components of S2S translation that were outlined above require the estimation of models conditioned on certain states. This, in turn, requires that the training data be appropriately annotated. Given the large amounts of data that these systems typically use, the annotation will be a very difficult and labor consuming task. For this reason a small manually annotated corpora is proposed and classifiers are built to automatically annotate larger training sets. Techniques from active learning are employed to selectively annotate more relevant data.

Figure 3:
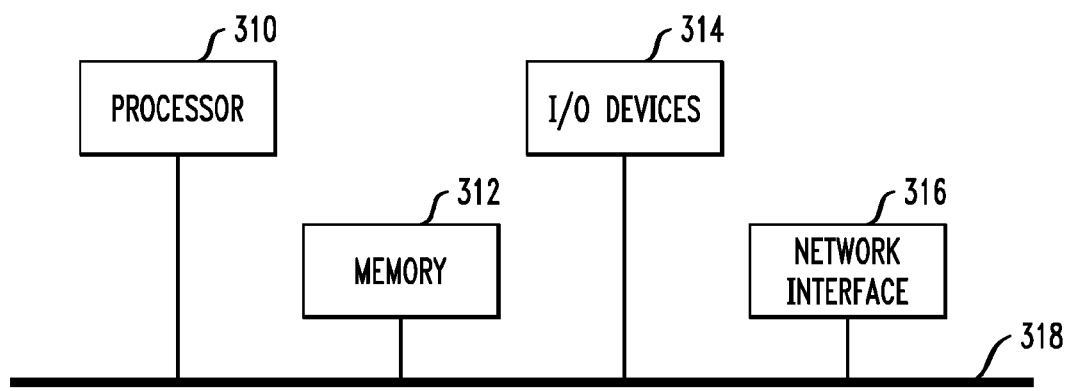
FIG. 3 is a block diagram illustrating an illustrative hardware implementation of a computing system in accordance with which one or more components/methodologies of the invention may be implemented, according to an embodiment of the present invention.

Referring now to FIG. 3, a block diagram illustrates an illustrative hardware implementation of a computing system in accordance with which one or more components/methodologies of the invention (e.g., components/methodologies described in the context of FIGS. 1 and 2) may be implemented, according to an embodiment of the present invention. For instance, such a computing system in FIG. 3 may implement the speech-to-speech translation system and the executing program of FIGS. 1 and 2.

As shown, the computer system may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering speech or text into the processing unit, and/or one or more output devices for outputting speech associated with the processing unit. The user input speech and the speech-to-speech translation system output speech may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of context adaptation of a speech-to-speech translation system comprising the steps of:
   extracting a plurality of sets of paralinguistic attribute values from a plurality of input signals, wherein each set of the plurality of sets of paralinguistic attribute values is extracted from a corresponding input signal of the plurality of input signals via a corresponding classifier of a plurality of classifiers;
   generating a final set of paralinguistic attribute values for the plurality of input signals from the plurality of sets of paralinguistic attribute values; and
   modifying performance of at least one of a speech recognition module, a translation module and a text-to-speech module of the speech-to-speech translation system in accordance with the final set of paralinguistic attribute values for the plurality of input signals;
   wherein the set of paralinguistic attribute values that each classifier extracts is represented by a vector signal output by the classifier, the vector signal comprising two or more values corresponding to two or more paralinguistic attributes of interest such that the step of generating the final set of paralinguistic attribute values comprises combining each of the vector signals from each of the classifiers by combining values of common paralinguistic attributes of interest across the vector signals to yield a separate decision value for each of the two or more paralinguistic attributes of interest, the final set of paralinguistic attribute values comprising a plurality of decision values corresponding to respective ones of the two or more paralinguistic attributes of interest;
   further wherein the extracting, generating and modifying steps are implemented via instruction code that is executed by at least one processor device.

2. The method of claim 1, wherein the step of extracting a plurality of sets of paralinguistic attribute values comprises the steps of:
   receiving each of the plurality of input signals at a corresponding one of the plurality of classifiers;
   determining a value for each of a plurality of paralinguistic attributes from each input signal;
   outputting a set of paralinguistic attribute values from each of the plurality of classifiers.

3. The method of claim 1, wherein, in the step of extracting a plurality of sets of paralinguistic attribute values, the paralinguistic attribute values comprise values for at least one of gender, accent, age, intonation, emotion, social background and educational level of a speaker.

4. The method of claim 1, wherein, in the step of extracting a plurality of sets of paralinguistic attribute values, the plurality of classifiers comprise at least one of a speech signal classifier, a visual signal classifier, a text input classifier, and a pointing device classifier.

5. The method of claim 4, wherein an input signal of the text input classifier comprises at least one of text entered by an operator and text obtained as feedback from the speech recognition module.

6. The method of claim 1, wherein, in the step of combining values of common paralinguistic attributes, each set of paralinguistic attribute values comprise a plurality of confidence values, and each of the plurality of confidence values corresponds to a paralinguistic attribute value, and wherein the plurality of confidence values are utilized in combining values.

7. The method of claim 1, wherein, in the step of combining values of common paralinguistic attributes, each set of paralinguistic attribute values is associated with a corresponding usefulness factor for each classifier, and the usefulness factor is utilized in combining values.

8. The method of claim 1, wherein, in the step of generating a final set of paralinguistic attribute values, the final set of paralinguistic attribute values define a social context of the plurality of input signals.

9. The method of claim 1, wherein, in the step of generating a final set of paralinguistic attribute values, the final set of paralinguistic attribute values enable question detection.

10. The method of claim 1, wherein the step of modifying performance comprises the steps of:
    constructing one or more models in at least one of the speech recognition module and the translation module in accordance with the final set of paralinguistic attribute values, wherein each model is conditioned on different paralinguistic attributes; and
    dynamically selecting an appropriate model from the one or more models during operation of at least one of the speech recognition module and the translation module.

11. The method of claim 1, wherein the step of modifying performance comprises the step of accessing an expression database to generate appropriate expression in the text-to-speech module based on the final set of paralinguistic attribute values.

12. The method of claim 1, wherein the step of modifying performance comprises the step of obtaining an appropriate pronunciation in the text-to-speech module based on the final set of paralinguistic attribute values.

13. The method of claim 1, wherein the plurality of decision values comprise values for at least two of gender, accent, age, intonation, emotion, social background and educational level of a speaker.

14. A context adaptable speech-to-speech translation system comprising:
   a memory
   at least one processor implementing:
   a plurality of classifiers, wherein each of the plurality of classifiers receives a corresponding input signal and generates a corresponding set of paralinguistic attribute values;
   a fusion module that receives a plurality of sets of paralinguistic attribute values from the plurality of classifiers and generates a final set of paralinguistic attribute values; and
   speech-to-speech translation modules comprising a speech recognition module, a translation module, and a text-to-speech module, wherein performance of at least one of the speech recognition module, the translation module and the text-to-speech module are modified in accordance with the final set of paralinguistic attribute values for the plurality of input signals;
   wherein the set of paralinguistic attribute values that each classifier generates is represented by a vector signal output by the classifier, the vector signal comprising two or more values corresponding to two or more paralinguistic attributes of interest such that the step of generating the final set of paralinguistic attribute values performed by the fusion module comprises combining each of the vector signals from each of the classifiers by combining values of common paralinguistic attributes of interest across the vector signals to yield a separate decision value for each of the two or more paralinguistic attributes of interest, the final set of paralinguistic attribute values comprising a plurality of decision values corresponding to respective ones of the two or more paralinguistic attributes of interest.

15. The context adaptable speech-to-speech translation system of claim 14, wherein the each of the plurality of classifiers receive a corresponding one of the plurality of input signals, determine a value for each of a plurality of paralinguistic attributes from each input signal, and output a set of paralinguistic attribute values from each of the plurality of classifiers.

16. The context adaptable speech-to-speech translation system of claim 14, wherein the speech-to-speech translation modules construct one or more models in at least one of the speech recognition module and the translation module in accordance with the final set of paralinguistic attribute values, wherein each model is conditioned on different paralinguistic attributes, and dynamically select an appropriate model from the one or more models during operation of at least one of the speech recognition module and the translation module.

17. The context adaptable speech-to-speech translation system of claim 14, wherein the speech-to-speech translation modules access an expression database to generate appropriate expression in the text-to-speech module based on the final set of paralinguistic attribute values.

18. The context adaptable speech-to-speech translation system of claim 14, wherein the speech-to-speech translation modules obtain an appropriate pronunciation in the text-to-speech module based on the final set of paralinguistic attribute values.

19. The context adaptable speech-to-speech translation system of claim 14, wherein the plurality of decision values comprise values for at least two of gender, accent, age, intonation, emotion, social background and educational level of a speaker.

20. An article of manufacture for context adaptation of a speech-to-speech translation system, comprising a non-transitory machine readable storage medium containing one or more programs which when executed by at least one processor device implement the steps of:
   extracting a plurality of sets of paralinguistic attribute values from a plurality of input signals, wherein each set of the plurality of sets of paralinguistic attribute values is extracted from a corresponding input signal of the plurality of input signals via a corresponding classifier of a plurality of classifiers;
   generating a final set of paralinguistic attribute values for the plurality of input signals from the plurality of sets of paralinguistic attribute values; and
   modifying performance of at least one of a speech recognition module, a translation module and a text-to-speech module of the speech-to-speech translation system in accordance with the final set of paralinguistic attribute values for the plurality of input signals;
   wherein the set of paralinguistic attribute values that each classifier extracts is represented by a vector signal output by the classifier, the vector signal comprising two or more values corresponding to two or more paralinguistic attributes of interest such that the step of generating the final set of paralinguistic attribute values comprises combining each of the vector signals from each of the classifiers by combining values of common paralinguistic attributes of interest across the vector signals to yield a separate decision value for each of the two or more paralinguistic attributes of interest, the final set of paralinguistic attribute values comprising a plurality of decision values corresponding to respective ones of the two or more paralinguistic attributes of interest.

* * * * *